(12) United States Patent
Wen et al.

(10) Patent No.: US 8,118,895 B1
(45) Date of Patent: Feb. 21, 2012

(54) METHOD AND APPARATUS FOR REFUELING EXISTING NATURAL GAS COMBINED CYCLE PLANT AS A NON-INTEGRATED GASIFICATION COMBINED CYCLE PLANT

(75) Inventors: Harvey Wen, Boyds, MD (US); Rattan K. Tawney, Boyds, MD (US)

(73) Assignee: Bechtel Power Corporation, Frederick, MD (US)

( * ) Notice: Subject to any disclaimer, the term of this patent is extended or adjusted under 35 U.S.C. 154(b) by 667 days.

(21) Appl. No.: 12/079,733

(22) Filed: Mar. 29, 2008

Related U.S. Application Data

(60) Provisional application No. 60/920,999, filed on Mar. 30, 2007.

(51) Int. Cl.
*C01B 3/24* (2006.01)

(52) U.S. Cl. ......... 48/198.3; 48/197 R; 48/76; 48/127.9; 60/682; 60/650; 60/655; 60/780; 423/245.1

(58) Field of Classification Search ........... 48/61, 127.9; 60/783, 775
See application file for complete search history.

(56) References Cited

U.S. PATENT DOCUMENTS

| | | | |
|---|---|---|---|
| 5,117,623 A | | 6/1992 | Arundale |
| 5,640,842 A | | 6/1997 | Bronicki |
| 5,688,296 A | | 11/1997 | Andrus |
| 5,715,671 A | | 2/1998 | Griffiths |
| 5,842,345 A | * | 12/1998 | Scharpf .......................... 60/649 |
| 6,321,539 B1 | * | 11/2001 | Bronicki et al. ............. 60/641.8 |
| 7,174,716 B2 | | 2/2007 | Brasz et al. |
| 2002/0006969 A1 | * | 1/2002 | O'Beck et al. ................ 518/704 |
| 2002/0121092 A1 | * | 9/2002 | Allam et al. .................... 60/780 |
| 2004/0123601 A1 | * | 7/2004 | Fan ................................. 60/781 |
| 2005/0229603 A1 | * | 10/2005 | Yamada et al. ................ 60/775 |

OTHER PUBLICATIONS

Olsen, John C., Unit Processes and Principles of Chemical Engineering, Jul. 5, 1932, D. Van Nostrand Company Inc., New York, Chapter I, pp. 1-3.*

* cited by examiner

*Primary Examiner* — Kaity V. Handal
(74) *Attorney, Agent, or Firm* — Cantor Colburn LLP

(57) ABSTRACT

A process of generating power utilizing a low level heat from a raw syngas produced in a quench gasifier is disclosed. The process includes a first stage that includes: producing raw syngas at the quench gasifier, making 150 psi saturated steam from the produced raw syngas, superheating the saturated steam, and using the superheated saturated steam in a low pressure steam turbine to generate power. The process includes a second stage that includes: providing the raw syngas and a process condensate stream to a thermal fluid vaporizer to vaporize an organic thermal fluid, and using the vaporized organic thermal fluid in an expander turbine to generate power via an organic Rankine cycle.

8 Claims, 1 Drawing Sheet

METHOD AND APPARATUS FOR REFUELING EXISTING NATURAL GAS COMBINED CYCLE PLANT AS A NON-INTEGRATED GASIFICATION COMBINED CYCLE PLANT

CROSS REFERENCE TO RELATED APPLICATIONS

This application is entitled to the benefits of U.S. Provisional Application Ser. No. 60/920,999 filed Mar. 30, 2007.

FEDERALLY SPONSORED RESEARCH

Not Applicable

SEQUENCE LISTING OR PROGRAM

Not applicable

FIELD OF INVENTION

This invention related to converting existing natural gas fired combined cycle power plants with coal-derived synthesis gas (syngas). This conversion would allow the relatively expensive natural gas fired power plants to burn relatively low cost coal fuel.

BACKGROUND OF THE INVENTION

Power plants built during the past decade in the US were mostly natural-gas-fired gas turbine combined cycle (GTCC) plants. Unfortunately, the operating capacity factor of these units is less than 25 percent due to the persistent high cost of natural gas. It is unlikely that the price of natural gas will return to the $3-$4 per million Btu level that served as the basis for the economics of these plants.

The use of syngas from lower-cost fuels such as coal to refuel these potentially stranded plants has been considered by many plant owners, but the large capital expenditure associated with the gasification facilities has been a deterrent. In addition, the uncertainties regarding carbon dioxide ($CO_2$) emissions requirements have led to delay or cancellation of many recent coal projects.

This invention provides a design for a lower-cost, thermally efficient, and standalone coal gasification plant for refueling natural gas combined cycle (NGCC) plants. The lower plant cost is achieved through the combination of two design features: a) use of a low-cost, quench-type gasifier rather than a gasifier with syngas coolers, and b) use of a low pressure (150 psi) steam turbine augmented by a binary cycle. This power recovery approach generates electricity from the low-level energy available downstream of the gasifier with an efficiency competitive with that of current coal-fired power plants.

In a coal gasification plant equipped with syngas cooler, about 20-25 percent of energy in coal is consumed during the exothermic gasification reaction, and it is partially recovered in the form of high pressure steam at about 1800 psig. Implementing a full thermal integration between a gasification plant and a combined cycle plant to refuel an existing GTCC plant is generally not practical due to two reasons: 1) relatively high costs of full recovery coal gasification plant equipped with syngas cooler, and 2) the existing steam turbine and heat recovery steam generator (HRSG) are unlikely to have excess capacity to accept the large amounts of saturated steam. Possible exceptions are NGCCs with high duct-firing capability.

This invention employs a quench gasifier to generate syngas. Based on published cost information, the cost of a quench gasifier is substantially lower than that of a radiant quench syngas cooler. For an integrated gasification combined cycle (IGCC) plant without carbon capture, the quench-gasifier-based plant is 11-14 percent lower in overall capital cost than the syngas-cooler-equipped gasification plant. In addition, the reliability of quench gasifiers has been commercially proven. Commercial coal gasification plant has reported that the quench gasifiers have on-stream reliability factors of 94-97 percent which is substantially higher that of the syngas-cooler-equipped gasifiers which is generally less than 85 percent.

This invention provides a method to refuel existing NGCC as a non-integrated gasification combined cycle (nIGCC) plant. The unique heat recovery scheme developed for this invention allows the NGCC to increase net power plant output with good thermal efficiency relative to conventional pulverized coal fired power plant. A NGCC plant rated at 250-260 MW net output is likely to produce up to 275 MWe net output. This added output is due to the increase in fuel mass flow as compared to that of natural gas. An overall thermal efficiency of 36%+ is competitive to most existing coal fired power plants.

If carbon capture is desired, a water shift converter can be placed upstream of the low pressure steam generator. Shift-converter requires the water to CO molar ratio to be about 2-2.5 to 1. Because water moisture is added to the syngas in the quench gasifier and the downstream water scrubber, additional steam injection to the syngas is not required for the shift converters. The syngas from a quench gasifier is considered a shift conversion ready syngas, and this makes the process more carbon capture ready than that of other processes.

The superheater (HRSG 7) can be supplementally fired with clean syngas produced internally to augment steam production to match the need for auxiliary power in the gasification plant. The amount of supplemental firing can be adjusted to automatically match an auxiliary load requirement for the coal conversion plant so that the entire coal-to-gas conversion facility is self sufficient in power supply.

SUMMARY

A natural gas fired gas turbine combined cycle (NGCC) can be retrofitted with coal derived syngas as a non-integrated gasification combined cycle. This invention provides a method to make the coal gasification plant a stand-alone plant with its own power supply and the low-level waste heat from the gasifier is efficiently utilized. Thermal integration between the NGCC and coal gasification plant is not required.

DETAILED DESCRIPTION OF THE EMBODIMENTS

Figure 1:
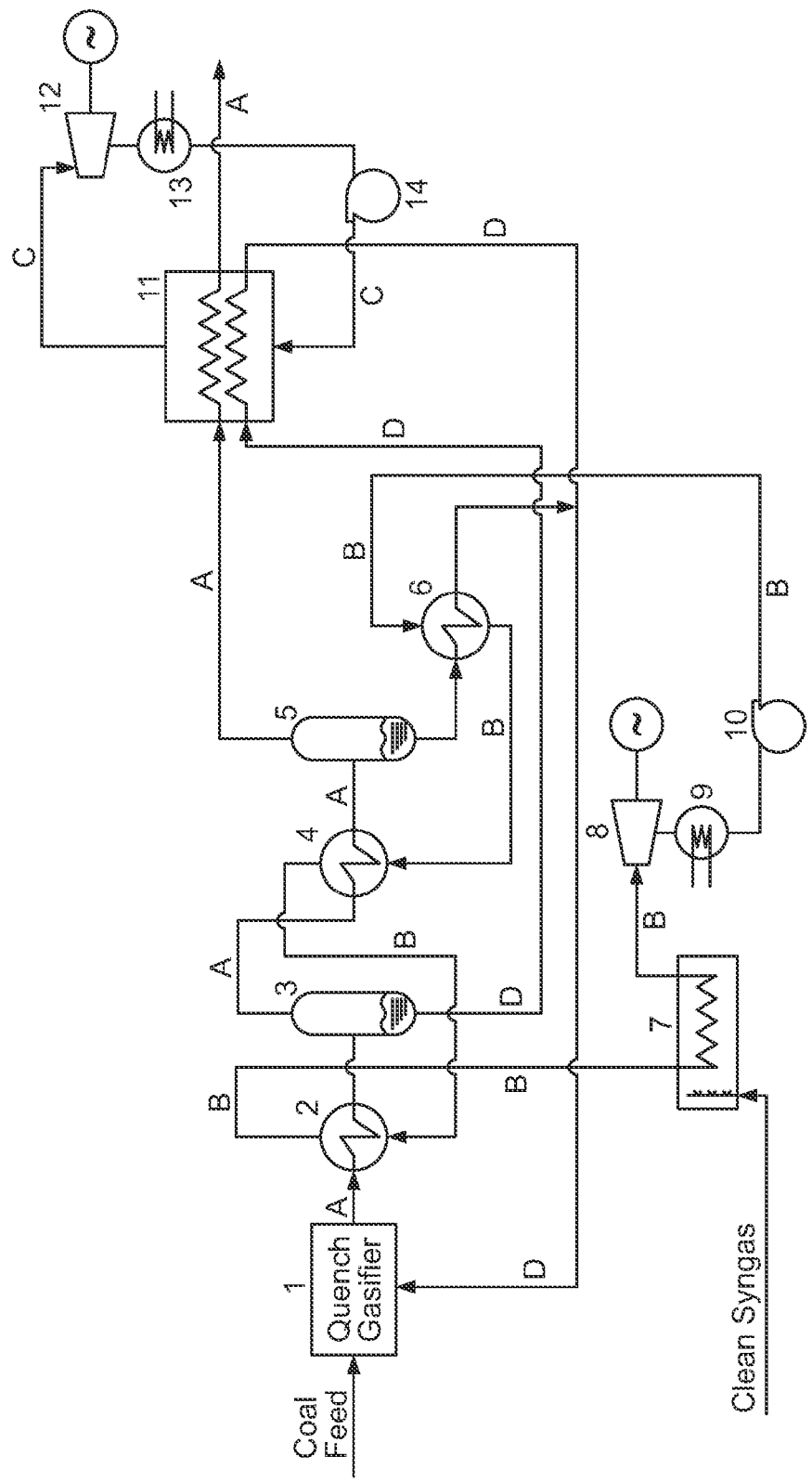
FIG. 1 is the process flow diagram for the invention. It shows the major equipment needed to recover the waste heat from the quench gasifier effluent syngas and the method of power generation using the low level heat recovered from these equipment items.

FIG. 1 is the process flow diagram for the invention. A quench type coal gasifier 1 will be employed in this process.

The raw syngas produced from an oxygen-blown quench type gasifier 1 is comprised of hydrogen, carbon monoxide, carbon dioxide, water vapor and a multitude of impurities including sulfur compounds and nitrogen compounds. Stream A represents the raw syngas flow path. After it is quenched in a water pool to 455 F at about 865 psia, it is cooled in a reboiler 2 to produce a saturated steam at 150 psia. Stream B represents the steam/water condensate flow path. The saturated steam from reboiler 2 is superheated in a supplemental fired HRSG 7 which is duct fired with clean syngas. In addition to provide superheating, the HRSG 7 also generates additional steam required to meet auxiliary power requirement of coal gasification plant operation and for startup. The superheated steam from HRSG 7 is used to drive a steam turbine 8 for power generation. The steam turbine exhaust is condensed in a water-cooled condenser 9 and water condensate is returned by pump 10 to the reboiler via condensate preheaters 6 and 4.

The raw syngas exiting reboiler 2 enters a condensate knockout drum 3 where raw syngas and process condensate separates. Stream D represents process condensate flow-path. The raw syngas stream A exiting knockout drum 3 enters the preheater 4 to preheat the water condensate stream B. The raw syngas stream A exiting preheater 4 enters into knock out drum 5 where raw syngas and process condensate separates. The raw syngas stream A is then further cooled in a thermal fluid (isopentane) vaporizer 11 and the process condensate enters preheater 6 to heat the returned steam condensate stream B.

An organic Rankine cycle (ORC) is employed to convert low level heat to power. It employs a thermal fluid in Stream C as its working fluid. The preferred thermal fluid is isopentane, but other organic hydrocarbon fluid such as propane or butane can also be used. The ORC cycle is comprised of a thermal fluid vaporizer 11, a thermal fluid turbine 12, a thermal fluid condenser 13, and a thermal fluid pump 14. The heat sources to the thermal fluid vaporizer are the raw syngas from knockout drum 5 and process condensate from knockout drum 3. The vaporizer 11 may be constructed as a single heat exchanger with multi-passes, or using two heat exchangers, one for each heat source. The cooled raw syngas stream A from vaporizer 11 is sent to an acid gas removal unit (not shown in the figure) before refueling existing NGCC plant. After giving up its heat, the process condensate streams D are sent to the quench gasifier block 1 where it will be treated and recycled.

What is claimed is:

1. A process of generating power utilizing a low level heat from a raw syngas produced in a quench gasifier, comprising:
    a first stage including:
    producing the raw syngas at the quench gasifier,
    making 150 psi saturated steam using the produced raw syngas to cool the raw syngas,
    superheating the saturated steam, and
    using the superheated saturated steam in a low pressure steam turbine to generate power; and
    a second stage including:
    providing the cooled raw syngas and a process condensate stream to a thermal fluid vaporizer to vaporize an organic thermal fluid, and
    using the vaporized organic thermal fluid in an expander turbine to generate power via an organic Rankine cycle.

2. The process of claim 1, wherein superheating the saturated steam further comprises supplementally firing a superheater superheating the saturated steam using clean syngas.

3. The process of claim 2, wherein the amount of supplemental firing is adjusted to match an auxiliary load requirement for a coal conversion plant.

4. The process of claim 1, wherein the process condensate stream is separated from the cooled raw syngas.

5. A power generation plant, comprising:
    a first stage including:
    a quench gasifier configured to produce the raw syngas,
    a reboiler configured to make 150 psi saturated steam using the produced raw syngas to cool the raw syngas,
    a heat recovery steam generator configured to superheat the saturated steam, and
    a low pressure steam turbine configured to generate power using the superheated saturated steam; and
    a second stage including:
    a thermal fluid vaporizer configured to vaporize an organic thermal fluid using the cooled raw syngas and a process condensate stream, and
    an expander turbine configured to generate power via an organic Rankine cycle using the vaporized organic thermal fluid.

6. The power generation plant of claim 5, further comprising a superheater configured to be supplementally fired to superheat the saturated steam using clean syngas.

7. The power generation plant of claim 5, wherein the amount of supplemental firing is adjusted to match an auxiliary load requirement for a coal conversion plant.

8. The power generation plant of claim 5, further comprising a knock-out drum configured to separate the process condensate stream from the cooled raw syngas.

* * * * *